United States Patent [19]

Karlock

[11] 4,445,152

[45] Apr. 24, 1984

[54] VIDEO DETAIL ENHANCING CIRCUIT

[76] Inventor: James A. Karlock, 3311 NE. 35th Ave., Portland, Oreg. 97212

[21] Appl. No.: 516,436

[22] Filed: Jul. 25, 1983

Related U.S. Application Data

[63] Continuation of Ser. No. 183,400, Sep. 2, 1980, abandoned.

[51] Int. Cl.³ .................. H04N 5/785; H04N 5/14; H04N 5/21; H04N 9/491
[52] U.S. Cl. .................. 360/33.1; 358/166; 358/167; 358/315; 358/335
[58] Field of Search .................. 360/33.1; 358/36, 37, 358/39, 166, 167, 310, 315, 335; 307/255, 264, 268, 522-524, 549, 551, 561

[56] References Cited

U.S. PATENT DOCUMENTS

| | | | |
|---|---|---|---|
| 2,678,964 | 5/1954 | Loughlin | 358/166 |
| 2,921,121 | 1/1960 | Grundmann et al. | 178/5.4 |
| 3,117,278 | 1/1964 | Johnson . | |
| 3,207,854 | 9/1965 | Johnson . | |
| 3,286,024 | 11/1966 | Melchior | 358/21 X |
| 3,288,930 | 11/1966 | Johnson | 358/167 X |
| 3,333,055 | 7/1967 | Krause | 358/167 |
| 3,532,808 | 10/1970 | Fujisawa | 360/33 |
| 3,715,477 | 2/1973 | Olson et al. | 358/36 |
| 3,760,094 | 9/1973 | Skerlos | 178/5.4 SD |
| 3,780,215 | 12/1973 | Shibata et al. | 178/5.4 R |
| 3,789,133 | 1/1974 | Kline | 178/5.4 R |
| 3,798,353 | 3/1974 | Illetschko | 358/37 |
| 3,875,537 | 4/1975 | Dolby . | |
| 3,952,227 | 4/1976 | Hofman et al. | 358/37 |
| 3,980,819 | 9/1976 | Schwartz | 358/166 |
| 4,003,079 | 1/1977 | Woo | 358/37 X |
| 4,009,334 | 2/1977 | Sypula | 358/167 |
| 4,030,121 | 6/1977 | Faroudja | 358/37 |
| 4,074,321 | 2/1978 | Miller | 358/37 X |
| 4,075,661 | 2/1978 | Heffron | 358/166 |
| 4,080,628 | 3/1978 | Jirka | 358/37 |
| 4,091,420 | 5/1978 | Omori et al. | 358/166 X |
| 4,096,516 | 6/1978 | Pritchard | 358/37 X |
| 4,142,221 | 2/1979 | Faroudja | 358/167 |
| 4,143,397 | 3/1979 | Holmes | 358/31 |
| 4,176,373 | 11/1979 | Dillon et al. | 358/37 |
| 4,198,650 | 4/1980 | Hongu et al. | 358/167 X |
| 4,223,339 | 9/1980 | Lagoni et al. | 358/37 X |
| 4,223,340 | 9/1980 | Bingham et al. | 358/37 X |
| 4,240,103 | 12/1980 | Poetsch et al. | 358/21 |
| 4,245,238 | 1/1981 | Fuhrer | 358/37 X |
| 4,249,202 | 2/1981 | Perry et al. | 358/36 |
| 4,262,304 | 4/1981 | Faroudja | 358/37 |
| 4,268,864 | 5/1981 | Green | 358/166 |

OTHER PUBLICATIONS

"Television Engineering Handbook"; Fink (Ed. in Chief) First Edition, 1957; McGraw-Hill Book Co., Inc., pp. 16-100-107.
CBS Labs Technical Bulletin, "Mark IV Automatic Image Enhancer, Models 8010, 8310 and 8410".
"A New Technique for Improving the Sharpness of Television Pictures", Oct. 1951, Journal of SMPTE, vol. 57, Goldmark et al., pp. 382-397.
McGraw-Hill Encyclopedia of Science and Technology, vol. 5, p. 47, ©1960, 1966, 1971.

Primary Examiner—Aristotelis M. Psitos
Attorney, Agent, or Firm—Klarquist, Sparkman, Campbell, Leigh, Whinston & Dellett

[57] ABSTRACT

A detail enhancing circuit for use with video tape recorders recovers or separates detail from the overall video signal and adds amplified detail back into the video signal. The luminance signal is differentiated and high amplitude transitions are clamped, leaving the detail information.

20 Claims, 2 Drawing Figures

VIDEO DETAIL ENHANCING CIRCUIT

This application is a continuation, of application Ser. No. 183,400, filed 9/2/1980.

BACKGROUND OF THE INVENTION

The present invention relates to circuitry for enhancing the detail of a video signal, and particularly to circuitry of this type that can be economically employed with a conventional video recorder.

Many video recording devices employ a "coring" circuit for eliminating noise in the signal during playback. High frequency, low amplitude information is assumed to be noise and is attenuated, but unfortunately considerable picture detail can be lost in the process. The resultant video picture has a flat look including sharp transitions or edges but with much of the detail lacking. Detail enhancing circuits are known for pre-emphasizing a video signal prior to recording, but equipment of this type tends to be complex, employing balanced modulators and the like, and may itself be more costly than the video tape recording apparatus rendering its use suitable only for the professional recording studio. Prior to the present invention, equipment was substantially unavailable for economically enhancing the detail of a playback signal derived from the average home video recording apparatus.

SUMMARY OF THE INVENTION

In accordance with the present invention in a preferred embodiment thereof, a clamping circuit is utilized for eliminating large level change transitions from a video luminance signal in order to isolate lower amplitude detail information. The detail information is then added back into a combined video signal to the extent desired. Preferably, a differentiated luminance signal is applied to a clamping circuit which also receives a differentiated luminance signal as a control input. The control acts to clamp out the differentiated luminance signal above a predetermined amplitude level while the lower amplitude detail information is passed through the circuit for addition to the video output.

The clamping circuit preferably comprises a pair of oppositely poled transistors having their collector-emitter paths disposed across the output of a differentiating circuit receiving the luminance signal as its input. As amplified and differentiated luminance signal is applied as a control to the bases of the transistors whereby higher amplitude spikes representing large transitions in the video signals applied across the transistors are clamped while lower amplitude detail information is passed. The clamping circuit preferably also includes a pair of reversely poled diodes disposed across the output of the differentiating circuit.

In accordance with a preferred embodiment of the present invention, an output circuit supplies an output at a predetermined level. A common base connected transistor provides a summing junction where the components of the video signal including the enhanced or accentuated detail information are added, while an emitter follower output stage is driven from the common base connected transistor. A feedback clamping circuit comprises a clamping capacitor coupled to the base of the common base connected transistor and a unidirectionally conducting semiconductor device for charging the capacitor from the emitter follower output stage.

In accordance with another aspect of the present invention, a circuit for separating chrominance and luminance signals comprises a first emitter follower stage, a second common base stage, an output terminal, and a tuned circuit interposed between the emitters of the first and second stages for selectively coupling the chrominance signal to the output terminal while luminance information is coupled via the second stage. The stages are of the same polarity type.

It is accordingly an object of the present invention to provide an improved video detail enhancing circuit for use with video tape recorders.

It is another object of the present invention to provide an improved video detail enhancing circuit which is relatively economical to employ with home video recording equipment.

It is another object of the present invention to provide an improved clamping circuit.

It is another object of the present invention to provide an improved output stage providing an output at a predetermined voltage level.

It is another object of the present invention to provide an improved circuit having signal separating means.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a schematic diagram of circuitry according to the present invention; and FIG. 2 is a waveform chart for illustrating operation of circuitry according to the present invention.

DETAILED DESCRIPTION

Figure 1:
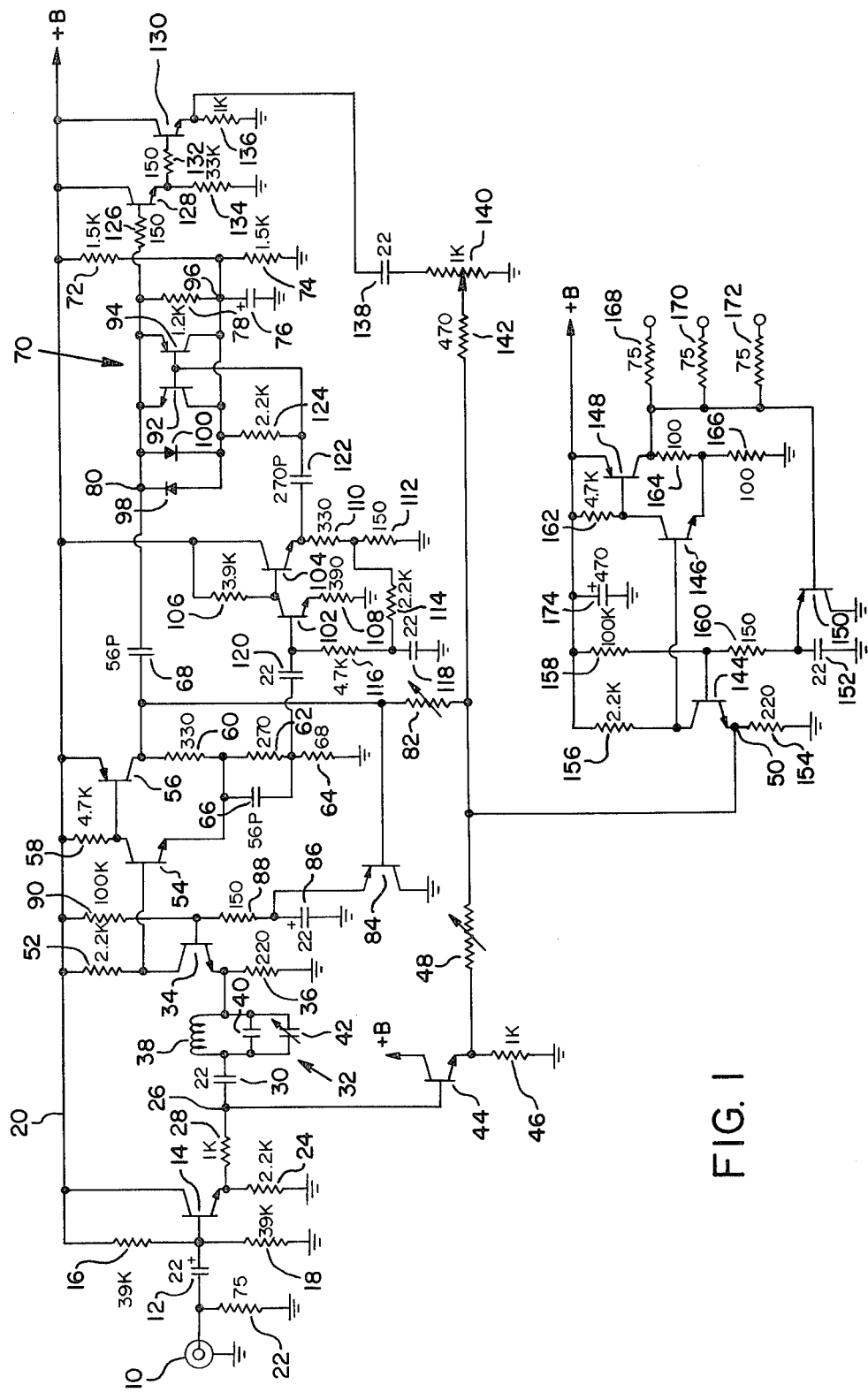

Referring to the drawings and particularly to FIG. 1 illustrating a circuit according to the present invention, a video input signal, for example from a video tape recorder, is applied to the video input coaxial connector 10 across resistor 22 and via coupling capacitor 12 to the base of NPN emitter follower transistor 14, said base also being connected to the mid point of a voltage divider comprising resistors 16 and 18 disposed for biasing purposes between voltage supply conductor 20 and ground. The collector of transistor 14 is connected to voltage supply conductor 20, while its emitter is returned to ground via emitter resistor 24 and to terminal 26 via coupling resistor 28. A series circuit comprising capacitor 30 and trap circuit 32 is interposed between terminal 26 and the emitter of NPN common base connected transistor 34, said emitter also being returned to ground via resistor 36. The trap 32 comprises an inductor 38 in parallel with fixed capacitor 40 and variable capacitor 42, tuned to 3.58 megahertz for trapping the video chrominance signal for providing the same as an output applied to chrominance emitter follower transistor 44, the base of which is connected to terminal 26. The collector of transistor 44 is connected to a positive voltage while a resistor 46 is interposed between the emitter of transistor 44 and ground. Color level adjustable resistor 48 couples the emitter of transistor 44 to current summing junction 50.

The circuit comprising transistors 14 and 34 and trap 32 is a signal separating circuit operative for developing the chrominance signal across trap 32 with respect to the grounded end of resistor 36 at approximately 3.58 megahertz. For other frequencies, the trap represents a substantial short circuit and couples the luminance video signal to the emitter of transistor 34.

Transistor 34 comprises a common base connected stage, the collector of which is connected directly to the base of transistor 54 and returned to a positive voltage point through resistor 52. Transistor 54 comprises part of a compound emitter follower circuit or voltage follower circuit together with PNP transistor 56, the emitter and base of which are connected to a positive voltage and to the collector of transistor 54, respectively. The collector of transistor 54 is supplied via resistor 58 from the source of positive voltage while the collector of transistor 56 is returned to ground through a voltage divider comprising resistors 60, 62 and 64 in series.

The emitter of transistor 54 is connected to the junction between resistors 60 and 62, a speed up capacitor 66 being interposed between the emitter of transistor 54 and the junction between resistors 62 and 64. The collector of transistor 56 provides a first output of the voltage follower circuit having a gain of two, and the junction between resistors 62 and 64 provides a second and attenuated output. The output at the collector of transistor 56 is supplied as the luminance signal to summing junction 50 via video level variable resistor 82.

The collector of transistor 56 is also connected to the base of PNP feedback transistor 84 having its collector grounded and its emitter connected to the junction between capacitor 86 and resistor 88 wherein capacitor 86, resistor 88 and resistor 90 are disposed in series between ground and voltage supply conductor 20. The base of NPN common base connected transistor 34 is connected to the junction between resistors 88 and 90 for setting the base bias.

The circuit including transistors 34, 54, 56 and 84 comprises a circuit for providing an output at a predetermined voltage level. In this circuit, the elements 84 and 86 are utilized for sync tip clamping and adjust the levels in the circuit such that the horizontal sync tips of the video signal are at a predetermined level, e.g. about one volt, while the remainder of the video signal at the collector of transistor 56 varies above the one volt level. Should the sync tip drop below approximately one volt, transistor 84 conducts for discharging capacitor 86 to provide the clamping or DC restoring action. While a transistor 84 is preferred, it will be appreciated that another unidirectionally conducting semiconductor device such as a diode could be substituted therefor in respect to charging clamping capacitor 86 at the sync tips, with the same polarities being observed.

The collector terminal of transistor 56 providing the first output thereof is coupled through differentiating capacitor 68 to a first terminal 80 of a clamping circuit 70 according to the present invention. A voltage divider comprising resistors 72 and 74 in series is interposed between voltage supply conductor 20 and ground, while a capacitor 76 is shunted across resistor 74. Differentiating resistor 78 is disposed between differentiating capacitor 68 and the center tap of the voltage divider 72, 74, and consequently a differentiated luminance signal is applied to the clamping circuit 70. The differentiating circuit may be said to couple at least the high frequency components of the luminance video signal to the clamping circuit. The time constant of circuit 68, 78 is desirably between 30 and 300 nanoseconds, with the time constant in the vicinity of 70 nanoseconds being optimum.

The clamping circuit 70 comprises a pair of oppositely poled transistors 92 and 94 having their collector-emitter paths shunted across the output of the differentiating circuit 68, 78, namely across resistor 78. In the particular example, the emitters of the transistors are connected to clamping circuit terminal 80, while the collectors of the transistors are connected to terminal 96 at the bottom end of resistor 78. Transistor 92 is an NPN transistor while transistor 94 is of the PNP type. The clamping circuit desirably further includes reversely poled diodes 98 and 100 which are shunted across differentiating resistor 78.

The control signal for the clamping circuit is applied at the commonly connected bases of transistors 92 and 94 and is derived from a buffer amplifier comprising NPN transistor 102 driving emitter follower transistor 104, wherein the collector of transistor 104 is connected to the positive voltage point, the collector of transistor 102 is coupled to the positive voltage point through resistor 106, the emitter of transistor 102 is returned to ground through resistor 108, and the emitter of transistor 104 is returned to ground through a voltage divider comprising resistors 110 and 112. The amplifier circuit comprising transistors 102 and 104 has a voltage gain of ten and includes a feedback bias circuit comprising a resistor 114 coupling the center tap of divider 110, 112 to the mid point between a circuit comprising resistor 116 and capacitor 118 coupled between the base of transistor 102 and ground. The base of transistor 102 is driven through coupling capacitor 120 from the junction between resistors 62 and 64, while the collector of transistor 102 is connected to the base of transistor 104. The amplifier 102, 104 is coupled to the bases of transistors 92 and 94 through a differentiating circuit comprising capacitor 122 and a resistor 124 disposed between the transistor bases and circuit terminal 96. The time constant of the differentiating circuit is adjusted for providing a desired width of clamping, $t_{on}$, as hereinafter described, to remove large or high amplitude transitions from the video signal passing clamping circuit 70. During clamping, the transistor 92 or the transistor 94 (depending upon the polarity of the signal) will shunt resistor 78, thereby substantially reducing the time constant of the circuit 68, 78 to effect clamping, leaving only a residual beginning edge spike.

It will be observed that although the amplifier 102, 104 is fed with an attenuated input, the amplification provided thereby produces an output swing and a differentiated signal through circuit 122, 124 that is greater in amplitude than the differentiated signal through circuit 68, 78. Consequently, the control provided to the bases of transistors 92 and 94 is effective for clamping out rapid, large, high amplitude transitions in the luminance signal from the collector of transistor 56. At the collector of transistor 56, the usual signal is about three volts peak to peak, while at the emitter of transistor 104, about a five volt peak to peak inverted luminance signal is present.

The main clamping of the luminance signal is provided by transistors 92 and 94. However, diodes 98 and 100 serve as a backup for better clamping and also conduct or shunt larger currents. While the diodes alone would clamp or clip large amplitude spikes from the luminance signal at a predetermined voltage level, the transistors 92 and 94 driven with an amplified version of the luminance signal are able to clamp the luminance signal nearly to zero over a time period dependent upon the time constant of elements 122, 124, and the transistor base-collector junctions. While the emitters of transistors 92 and 94 are connected to terminal 80 and their collectors are connected to terminal 96, and while an inverted, differentiated, amplified luminance signal is employed to drive the bases of transistors 92 and 94, it will be appreciated that the transistors 92 and 94 could be inverted, i.e. with their emitters connected to terminal 96 and their collectors connected to terminal 80. In any case, a noninverted control signal on their bases could be employed.

By adjusting the voltages on the bases of transistors 92 and 94, i.e. the amount of drive from circuit 102, 104, the point at which clamping starts can be adjusted. The low amplitude AC signal from the collector of transistor 56 is assumed to be detail and is left alone. On the other hand, large or high amplitude transitions are clamped out by the circuit according to the present invention in order to isolate the detail therefrom. The circuit is adjusted to recover the detail eliminated by the coring circuit of a video recorder and clamping is adjusted to take place with respect to the sharp edges retained by the coring circuit of the video recorder. The voltage levels are adjusted by adjusting component values, particularly in the circuit including transistors 102, 104 as will be appreciated by those skilled in the art, so that the higher spikes are clamped out and a good picture is obtained. Component values on the drawing are typical for the overall circuit wherein resistances are in ohms and capacitances are in microfarads unless otherwise indicated.

At the output of the clamping circuit 70, an enhanced detail signal is thus provided and is coupled through resistor 126 to a pair of cascaded emitter follower transistors comprising transistor 128 having its emitter coupled via resistor 132 to the base of transistor 130. The collectors of the transistors are connected to the source of positive voltage, while their emitters are returned to ground via resistors 134 and 136. The emitter of transistor 130 is coupled by capacitor 138 to one side of detail level potentiometer 140 having its opposite end grounded and having its movable tap coupled via resistor 132 to summing point 50. The double emitter follower is employed to provide a low enough impedance output to drive into the summing junction. Through the utilization of variable resistors 48, 82 and 140 the desired chrominance, luminance and detail can be added.

An output circuit including transistors 144, 146, 148 and 150 comprises a circuit for providing the output at a predetermined voltage level and is substantially similar to the hereinbefore circuit comprising transistors 34, 54, 56 and 84. It is desired to provide the output signal sync tips at a predetermined DC level. Consequently the output is clamped employing feedback clamping elements 150 and 152 at approximately one volt, while the video signal varies to approximately three volts.

The emitter of common base connected transistor 144 is returned to ground through resistor 154, its collector is coupled to the voltage supply through resistor 156, and its base is tapped on a voltage divider comprising resistors 158 and 160, and capacitor 152. The collector of transistor 144 is connected to the base of transistor 146 forming a part of a compound emitter follower or voltage follower with transistor 148. The collector of transistor 146 is connected to the base of transistor 148 and via resistor 162 to the positive voltage supply. The emitter of transistor 148 is connected to the positive voltage supply while its collector is returned to ground through a voltage divider comprising resistors 164 and 166 having a center tap to which the emitter of transistor 146 is connected. Coupling resistors 168, 170 and 172 provide outputs for the circuit. A filtering capacitor 174 is disposed between the positive voltage supply and ground. The operation of the circuit including transistors 144, 146, 158 and 150 is substantially the same as the operation of the circuit comprising transistors 34, 54, 56 and 84, except that the various currents are summed at the emitter summing terminal 50, and a second output is not supplied from the voltage divider 164, 166. Therefore, the operation of the circuit will not be repeated.

The variable resistance controls 48, 82, and 140 are adjusted to combine the desired chrominance signal, luminance signal and added detail in such manner as to provide an improved picture when viewing a TV monitor or the like receiving its input from one of the output resistors 168, 170 or 172. Thus, the amount of detail can be recombined as a current into the summing point 50 to the extent desired relative to the luminance signal.

Figure 2:
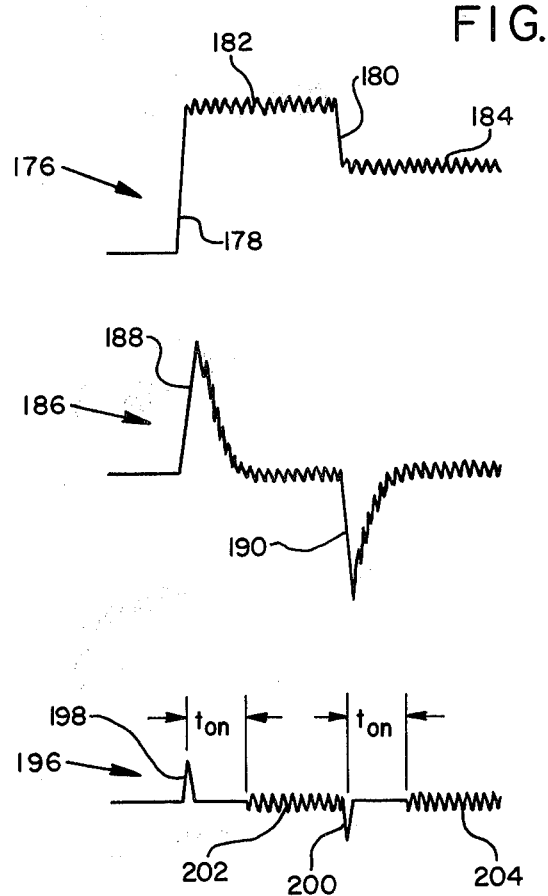

The operation of the overall circuit will be considered with respect to the waveform chart of FIG. 2 wherein 176 represents a typical video input waveform having fast, high amplitude transitions 178 and 180 as may represent a shift from a black area to a white area or vice versa, and detail signals 182 and 184. This is the type of signal which is found at the collector of transistor 56. The waveform 186 represents the differentiated waveform as would appear at terminal 80 without the clamping circuit functioning. Thus, as will be seen, fast transitions 188 and 190 appear with some detail along the trailing edges thereof.

Waveform 196 comprises the actual waveform at terminal 80 with clamping, wherein the clamping periods are designated "ton" as determined by the time constant of circuit 122, 124. It is seen that some residual spikes, 198 and 200 are left, but mainly the detail 202 and 204 is recovered which may be added back into the signal at summing point 50 via potentiometer 140 to the extent desired. The residual edges 198 and 200 would actually be larger without diodes 98 and 100 which are faster acting than the transistors. However, the transistors are mainly effective for the main portion of the clamping period "ton". Also, lengthening of the clamping period is beneficial because many tape machines appear to be noisy on edges. The small residual edge spikes which are left are in part beneficial for adding some definition back into the signal in addition to the enhanced or amplified detail.

The present circuit may be employed at the output of a typical video tape recorder for enhancing the detail of the video signal viewed, or alternatively may be employed between the video source and the tape recorder for pre-enhancing the detail.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. Circuitry for enhancing detail in video signals used in video tape recorders, said circuitry comprising:
   means for providing a video signal,
   means responsive to transitions in said video signal for providing control signals corresponding in time to said transitions, clipping means for receiving at least high frequency components of said video signal, said clipping means being responsive to given control signals for suppressing its input signal for a predetermined time, a common base connected transistor having an input current summing junction at the emitter terminal thereof for receiving said video signal from said means for providing a video signal and receiving the output of said clipping means, an emitter follower output stage driven from the collector of said common base connected transistor, and a feedback clamping circuit including a clamping capacitor coupled to the base of said common base connected transistor and a unidirectionally conducting semiconductor device for charging said capacitor from the output stage.

2. The circuit according to claim 1 including means for amplifying said control signals as compared with said high frequency components of the video signal received by the clipping means.

3. The circuit according to claim 1 further including a signal separating circuit comprising:

a first emitter follower transistor stage having a resistor returning its emitter to a common reference potential, its base being coupled to said means for providing a video signal, a second common base transistor stage having a resistor returning its emitter to a common reference potential, a first terminal coupled to the emitter of said first stage, a tuned circuit interposed between said emitters for selectively coupling a signal of predetermined frequency to said first terminal while coupling signals of other frequencies to said second stage, means for coupling said second stage as input to said clipping means, and means for coupling the output of said first terminal in common with the output of said clipping means to provide a common output.

4. Circuitry for enhancing detail in video signals used in video tape recorders, said circuitry means for providing a video input signal, first differentiating circuit means for receiving said video input signal and providing a first differential thereof, second circuit means also responsive to said video input signal for detection of large high frequency transitions therein to provide a control signal, a clipping circuit for receiving the output of said first differentiating circuit means, said clipping circuit being responsive to said control signal for bringing about clipping of the output of said first circuit means to suppress said large transitions while substantially passing first differential signals representative of low amplitude detail information, and output summing means for also receiving said video input signal, and for receiving the output of said clipping circuit including said signals representative of low amplitude detail information, for producing an output combining said signals representative of low amplitude detail information with said video input signal and including DC restoration means for maintaining said output at a predetermined reference level.

5. The circuitry according to claim 4 wherein said second circuit means includes means for amplifying said large transitions to provide said control signal.

6. Circuitry for enhancing detail in video signals used in video tape recorders, said circuitry comprising:

means for providing a video input signal, first differentiating circuit means for receiving said video input signal and providing a first differential thereof, second circuit means also responsive to said video input signal for detection of large transitions therein to provide a control signal, third circuit means for receiving the first differential output of said first differentiating circuit means, said third circuit means being responsive to said control signal for bringing about suppression of large transitions in the output of said first differentiating circuit means, while substantially passing first differential signals representative of low amplitude detail information, and output summing means for also receiving said video input signal, and for receiving the output of said third circuit means including said signals representative of low amplitude detail information, for producing an output combining said signals representative of low amplitude detail information with said video input signal.

7. The circuitry according to claim 6 wherein said second circuit means also provides a first differential of said video input signal.

8. The circuitry according to claim 6 wherein said second circuit means includes amplifier means.

9. The circuitry according to claim 6 wherein said third circuit means comprises a clipping circuit for bringing about said suppression of large transitions by clipping of said output of said first differentiating circuit means.

10. The circuitry according to claim 9 wherein said clipping circuit suppresses said large transitions except for residual portions thereof.

11. The circuitry according to claim 9 wherein said clipping circuit comprises a pair of oppositely poled transistors having their collector-emitter paths shunted across the output of said first differentiating circuit means, and wherein said control signal is coupled to the bases of said transistors.

12. The circuitry according to claim 11 further comprising a pair of oppositely poled diodes shunted across the output of said differentiating circuit means.

13. The circuitry according to claim 9 wherein said output summing means includes:

a common base connected transistor having an input current summing junction for receiving said video input signal and the output of said clipping circuit, an emitter follower output stage driven from said common base connected transistor, and a feedback clamping circuit including a clamping capacitor coupled to the base of said common base connected transistor and a unidirectionally conducting semiconductor device for charging said capacitor from said output stage.

14. The circuitry according to claim 9 including circuit means for coupling said video input signal to said first differentiating circuit means and to said second circuit means comprising:

a common base connected transistor having an input junction receiving said video signal, an emitter follower output stage driven from said common base connected transistor and providing its output to said first differentiating means and said second circuit means, and a feedback clamping circuit including a clamping capacitor coupled to the base of said common base connected transistor and a unidirectionally conducting semiconductor device for charging said capacitor from said emitter follower output stage.

15. The circuitry according to claim 14 further including a signal separating circuit interposed between said means for providing a video input signal and said common base connected transistor, said signal separating circuit comprising:

a first emitter follower transistor stage having a resistor returning its emitter to a common reference potential, an output terminal coupled to the emitter of said first emitter follower transistor stage, a tuned circuit interposed between said emitter of said first emitter follower transistor and said input junction for selectively coupling a signal of predetermined frequency to said output terminal while coupling signals of other frequencies to said common base connected transistor, and means for combining the signal at said output terminal with the output of said clipping circuit.

16. The circuitry according to claim 15 further including means for combining the output of said emitter follower output stage with the output of said clipping circuit.

17. The circuitry according to claim 6 wherein said second circuit means comprises amplification means and a differentiating circuit.

18. The circuitry according to claim 6 wherein said third circuit means comprises gate means responsive to said control signal to selectively gate said first differential signal from said first differentiating circuit means to a shunt path in response to said control signal while providing an output representing low amplitude detail information at other times.

19. The circuitry according to claim 6 wherein said first differentiating circuit means comprises an RC circuit having a time constant between 30 and 300 nanoseconds.

20. The circuitry according to claim 19 wherein said time constant is in the vicinity of 70 nanoseconds.

* * * * *